United States Patent [19]

Bateman et al.

[11] 4,107,992
[45] Aug. 22, 1978

[54] FLUID METER

[75] Inventors: Coates F. Bateman, West Hartford; Louis Soltanoff, Stamford, both of Conn.

[73] Assignee: Veeder Industries, Inc., Hartford, Conn.

[21] Appl. No.: 765,685

[22] Filed: Feb. 4, 1977

[51] Int. Cl.² .............................................. G01F 3/06
[52] U.S. Cl. .................................................. 73/260
[58] Field of Search .................................. 73/253–260, 73/229, 231 R; 418/61 R, 259, 270; 324/34 D, 34 PS, 45, 173, 174

[56] References Cited

U.S. PATENT DOCUMENTS

| 348,217 | 8/1986 | Isbell | 73/260 X |
| 1,935,096 | 11/1933 | Muller | 418/61 X |
| 1,961,592 | 6/1934 | Muller | 418/61 X |
| 2,017,825 | 10/1935 | Woodford | 73/259 |
| 3,166,936 | 1/1965 | Fisher et al. | 73/231 R |
| 3,613,000 | 10/1971 | Weir | 324/46 X |
| 3,636,767 | 1/1972 | Duffy | 73/229 |
| 3,821,899 | 7/1974 | Granberg | 73/260 |
| 3,874,235 | 4/1975 | Sanden | 73/253 |

Primary Examiner—Richard C. Queisser
Assistant Examiner—John P. Beauchamp
Attorney, Agent, or Firm—Prutzman, Hayes, Kalb & Chilton

[57] ABSTRACT

A fuel dispensing system having a positive displacement vane type fuel meter with an enclosed rotor assembly mounted within a fluid tight housing and connected to a fluid inlet and outlet of the housing to be rotated in direct proportion to the volume of gasoline conducted through the meter and two alternative embodiments of electrical pulse generating means with two Hall effect pickups mounted externally of the housing, ferromagnetic plugs extending through the housing and ferromagnetic means mounted on the rotor assembly to cooperate with the ferromagnetic plugs to generate an electrical pulse with each pickup for each predetermined increment of gasoline conducted through the meter.

15 Claims, 7 Drawing Figures

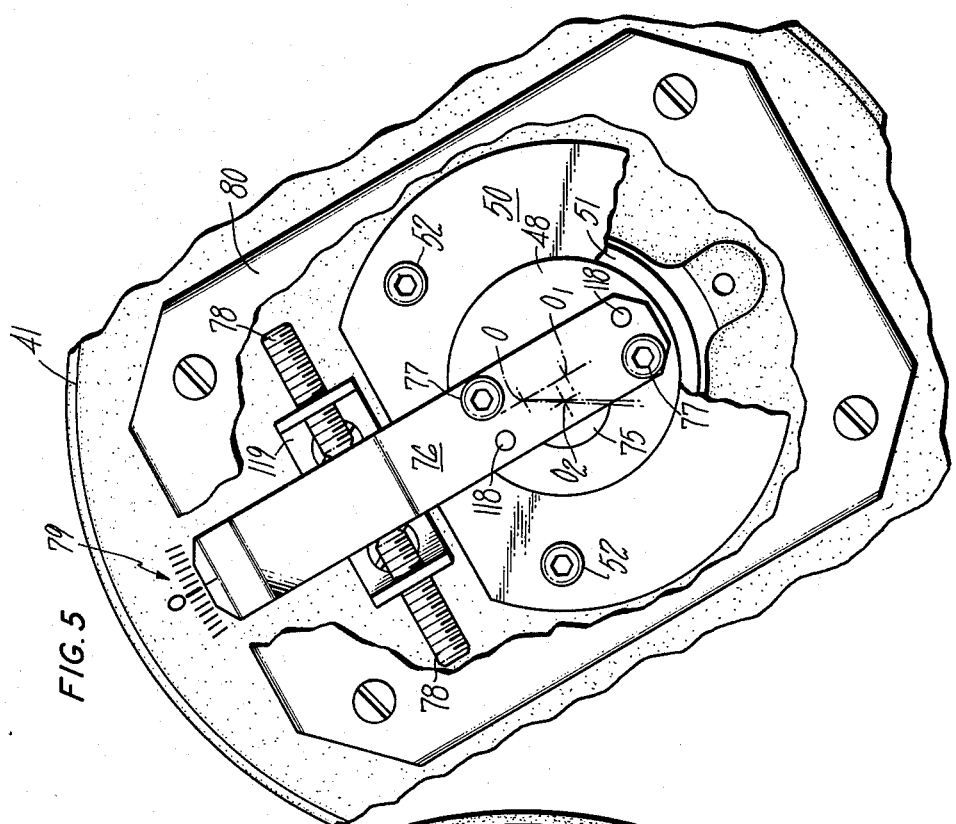

FLUID METER

BRIEF SUMMARY OF THE INVENTION

The present invention relates to a fluid meter having notable utility in fluid dispensing systems for measuring the volume of fluid dispensed.

In fluid dispensing systems, particularly those used for dispensing fluid such as gasoline having a high unit volume price, it is essential that the fluid meter employed in the system for measuring the volume of fluid dispensed is accurate so that the computed cost based on the measured volume is accurate. Accordingly, it is a principal object of the present invention to provide a new and improved fluid meter which provides a highly accurate measure of the volume of fuel dispensed over an extended period of use.

It is another object of the present invention to provide in a rotary fluid meter, a new and improved output drive having a volume output useful in driving, for example, a suitable volume accumulator with a low required torque.

It is another aim of the present invention to provide a new and improved positive displacement rotary fluid meter having a minimum internal fluid leakage and a resulting highly accurate metering capability.

It is a further object of the present invention to provide a new and improved gasoline meter which provides for accurately metering gasoline over a very long service-free life.

It is another object of the present invention to provide a new and improved positive displacement rotary fluid meter which may be adjusted to accurately establish the positive displacement volume of the meter.

It is a still further object of the present invention to provide a new and improved fluid operated positive displacement meter which requires a very low fluid pressure differential for fluid operation.

It is a further object of the present invention to provide a new and improved fluid meter having a compact and economical construction.

Other objects will be in part obvious and in part pointed out more in detail hereinafter.

A better understanding of the invention will be obtained from the following detailed description and the accompanying drawings of illustrative applications of the invention.

BRIEF DESCRIPTION OF THE DRAWINGS

In the drawings:

FIG. 4 is an enlarged front end view, partly broken away and partly in section, of the fluid meter;

FIG. 5 is an enlarged partial front end view, partly broken away, of the fluid meter;

DESCRIPTION OF THE PREFERRED EMBODIMENTS

Figure 1:
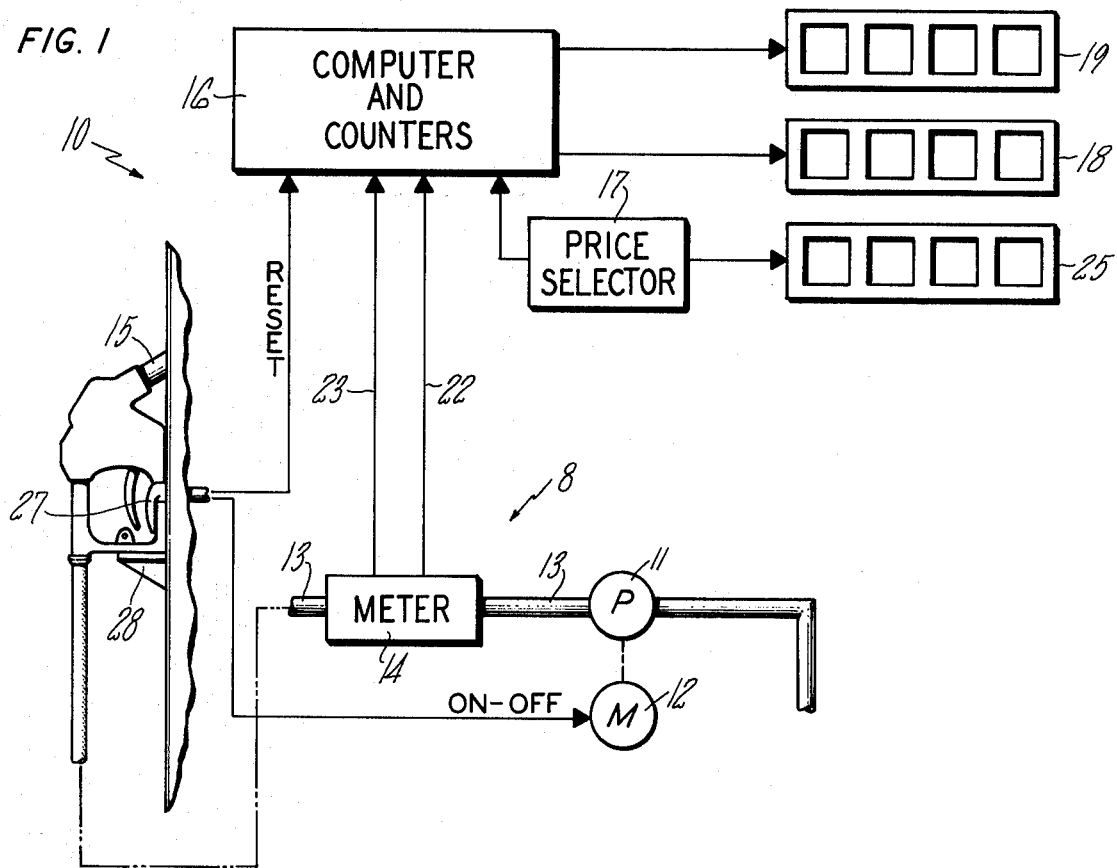
FIG. 1 is a schematic representation, partly broken away, of a fuel dispensing system incorporating an embodiment of a fluid meter of the present invention.
Figure 3:
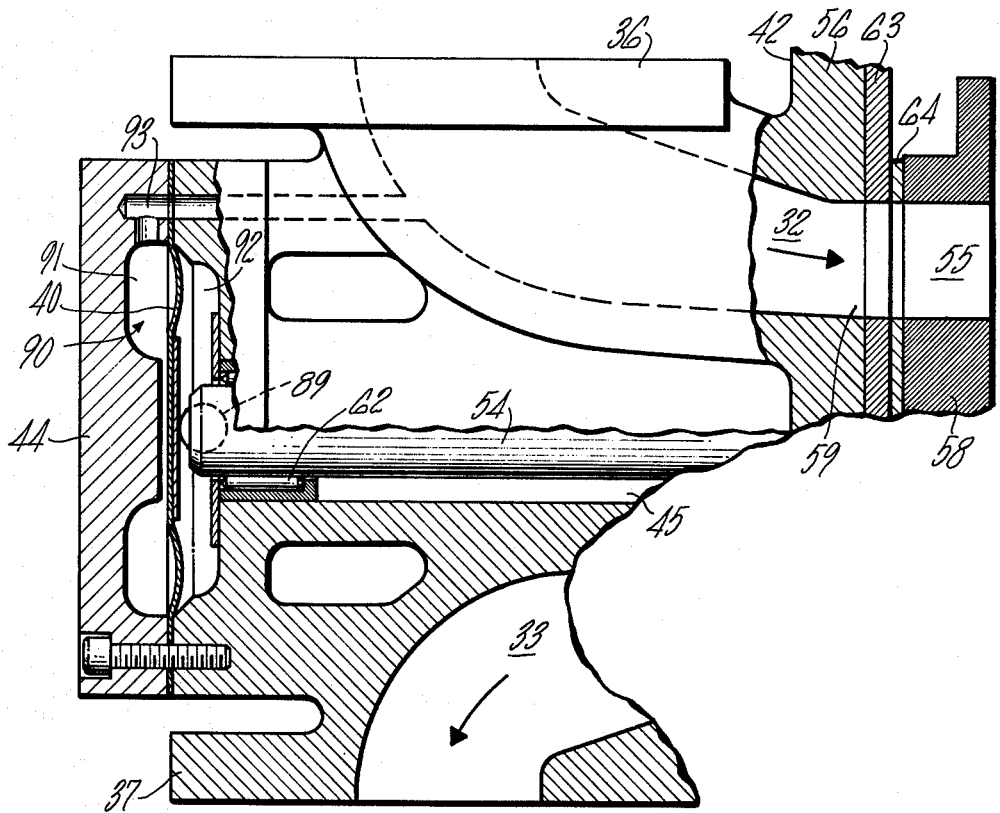
FIG. 3 is an enlarged partial longitudinal view, partly broken away and partly in section, of a rear longitudinal end of the fluid meter.

Referring now to the drawings in detail wherein like numerals represent like parts throughout the drawings, there is illustrated in FIG. 1 a gasoline dispensing system 10 employing an embodiment 8 of a fluid meter of the present invention. In a conventional manner, the gasoline dispensing system 10 has a fuel pump 11 driven by an electric motor 12 for delivering fuel under pressure from a supply tank (not shown) via a conduit 13 and the fuel meter 14 to a dispensing nozzle 15 for delivery to an automobile or other vehicle. The dispensing system 10 employs a suitable electronic computing and accumulating unit 16 connected by electrical leads 22, 23 to be operated by the meter 14 to (a) accumulate the volume of fuel dispensed and indicate the accumulated volume with a volume indicator 19, and (b) compute and accumulate the cost of fuel dispensed in accordance with a unit volume price established with a price selector 17 and shown by a price indicator 25 and indicate the accumulated cost with a cost indicator 18. The electronic computing and accumulating unit 16 and price selector 17 may be of known design, for example as generally shown and described in U.S. Pat. No. 3,696,236 for "Computing Device" issued Oct. 3, 1972 to Crawford M. Kus.

For operating the electronic unit 16, the fuel meter 14 generates (as will be described more fully hereinafter) a train of electrical volume signals or pulses as a volume output of the volume amount of fuel dispensed and with each pulse being generated for each predetermined incremental volume amount of gasoline conducted through the meter 14 (e.g., one hundredth or one thousandth of a unit volume such as a gallon, quart or liter on which the unit volume price is based). The electronic unit 16 receives the volume pulses from the meter 14 and with that volume input accumulates the volume of fuel dispensed and computes and accumulates the cost of fuel dispensed in accordance with the unit volume price established by the price selector 17.

A control handle 27 adjacent a nozzle support 28 is suitably connected so that when it is pivoted to its "on" or horizontal position (permitted after the nozzle 15 is removed from its support 28), the electronic unit 16 is reset (to zero the cost and volume accumulators or counters of the electronic unit 16 and thereby also zero the corresponding cost and volume indicators 18, 19) and the pump motor 12 is energized to condition the system for delivering fuel, and when the handle 27 is pivoted to its vertical or "off" position (thereby permitting the nozzle 15 to be returned to its support 28), the pump motor 12 is de-energized.

The fuel meter 14 comprises a six vane positive displacement rotor assembly 5 rotatably mounted within a completely sealed multipart cast aluminum housing 31 having front and rear axially aligned housing parts 41, 42 secured together by suitable fasteners 43. A fluid seal is provided between a radial end flange or face plate 56 of the rear housing part 42 and an annular axially extending flange 53 of the housing part 41 by an O-ring seal 46 mounted within an annulus in the annular flange 53. The rear housing part 42 has diametrically related generally axially extending inlet and outlet passageways 32, 33 respectively and suitable corresponding diametrically opposed mounting flanges 36, 37 for mounting the meter in the fluid conduit 13. The annular flange 53 of the front housing part 41 provides a cylindrical operating chamber 61 for the rotor assembly 5 and the rear housing part 42 has an axially extending bore 45 coaxial with the operating chamber 61 and suitable needle bearings 62 are mounted within the bore 45 for rotatably supporting a support shaft 54 of the rotor assembly 5.

The inlet and outlet passageways 32, 33 provide for conducting fluid to and from the operating chamber 61 via suitable diametrically opposed circumferentially extending inlet and outlet ports 59 and 60 respectively. Also, a cavity 90, enclosed by an end cap 44 of the housing 31, is provided at the rear end of the housing 31. A diaphragm 40 is provided between the end cap 44 and rear housing part 42 to separate the cavity 90 into two separate fluid pressure chambers 91, 92 and also provide a fluid seal between the opposed faces of the rear end cap and rear housing part 42.

A thrust plate 63 having a wear liner 64 suitably affixed thereto is secured to the inner face of the flange 56 by suitable fasteners 65 to present a low friction thrust bearing for the rotor 5. The wear liner 64 is preferably made of a material, such as Teflon or the like, having a very low coefficient of friction. The thrust plate 63 and its wear liner 64 have circumferentially extending openings conforming to and in registry with the inlet and outlet ports 59, 60.

A cage 35 of the rotor assembly 5 is mounted on the support shaft 54 for rotation within the operating chamber 61 about an axis designated "0" in the drawings. More particularly, a circular end plate 58 of the cage 35, which is preferably made of aluminum, is suitably fixed onto the inner end of the shaft 54, and a multipart generally cylindrical ring 57 of the cage 35 is secured to a peripheral radially extending narrow flange portion of the end plate 58 by suitable fasteners 69.

The cage end plate 58 engages the wear liner 64 with a very low coefficient of friction and has six equiangularly spaced fluid ports or openings 55 of generally truncated triangular shape, one for each of six separate variable displacement chambers 38 of the rotor assembly 5. The ports 55 of the cage end plate and the inlet and outlet ports 59, 60 are dimensioned and located so that as the rotor assembly 5 rotates within the operating chamber 61, each port 55 and therefore the corresponding chamber 38 rotates sequentially into communication with the inlet and outlet ports 59, 60 without simultaneous communication with both ports 59, 60 and yet also without substantial angular rotation between the ports 59, 60.

The multipart generally cylindrical ring 57 comprises an annular arrangement of six equiangularly spaced extruded arcuate aluminum segments 68 which axially abut the inner face of the end plate 58 and are secured thereto by the fasteners 69 using two fasteners 69 for each segment 68. Each segment 68 has axially extending concave bearing seats 70 at its opposite circumferentially spaced edges and such that the opposed bearing seats 70 of each adjacent pair of segments provide a partially cylindrical seat for receiving a pair of opposed axially extending nearly semi-cylindrical rod guide shoes 71. Also, adjacent segments 68 have sufficient angular spacing so that suitable vane clearance slots 72, 73 extending generally radially outwardly and inwardly of each bearing seat 70 are provided for a generally radially extending rotor vane 85.

A generally cylindrical hub 48 is mounted within an axially extending cylindrical bore 47 in the front end of the front housing part 41, and an O-ring seal 49 is mounted in a peripheral annulus of the hub 48 to provide a fluid seal therebetween. The hub 48 has a circular peripheral flange 51 engageable with an outer flat annular face of the housing surrounding the bore 47 and the hub 48 is adapted to be clamped in any established angular position against the housing by a clamping ring 50 clamped against the flange 51 by threaded fasteners 52 threaded into the housing.

An inner eccentric rotor 74 is rotatably mounted by a suitable needle bearing 81 on a cantilever stub shaft 75 secured within a bore in the hub 48 and extending axially into the operating chamber 61. The hub 48 is mounted for angular adjustment about an axis "$0_1$" which is eccentric to the axis "0" of the cage 35, and the stub shaft 75 is fixed within an eccentric bore in the hub such that as seen in FIGS. 4 and 5 the axis "$0_2$" of the stub shaft 75 is eccentric to the hub axis "$0_1$" and is also eccentric to the axis "0" of the cage 35 by an amount dependent on the angular setting of the hub 48.

A lever 76 is affixed to the outer face of the hub 48 by a pair of threaded fasteners 77 and is precisely angularly located on the hub 48 by a pair of spaced alignment pins 118 mounted on the hub 48 and received within suitable locating holes in the lever 76. The angular setting of the hub 48 is established by a pair of aligned adjustment screws or stops 78 mounted on a bracket 119 affixed to the housing. By complementary threading and unthreading the adjustment screws 78, the lever 76 can be finely angularly adjusted, in the desired direction, to accurately set the eccentricity of the stub shaft 75 and therefore the inner rotor 74 relative to the cage 35. An indicating scale 79 is inscribed on the end face of the housing to cooperate with a pointer inscribed on the outer end of the lever 76 to serve as a reference for adjustment. A removable cover 80 is secured to the housing for protecting the adjustment mechanism, etc., against foreign matter and unauthorized access. The lever 76 does however extend under and beyond the cover 80 for reading the angular setting.

The angular orientation of the eccentricities of the axes "$0_1$" to "0" and "$0_2$" to "$0_1$" are such that rotation of the hub 48 through an angle of 15 degrees (i.e., ± 7 ½° from the inscribed midpoint reference) is operative to vary the displacement of the meter 14 about 25%. At the midpoint of the 15° angle adjustment range of the axis "$0_2$" about the fixed axis "$0_1$" of the hub 48, the common or intersecting plane of the parallel axes "$0_1$" and "$0_2$" is normal to the common or intersecting plane of the parallel axes "0" and "$0_2$" (or in other words a transverse line intersecting and perpendicular to the parallel axis "$0_1$" and "$0_2$" is normal to such a transverse line intersecting the axes "0" and "$0_2$"). Consequently, as generally shown in FIG. 5, the eccentricity of the inner rotor 74 can be adjusted with a minimum and very small variation in the angular relationship of the inner rotor axis "$0_2$" to the fixed primary axis "0" of the outer cage 35. Accordingly, the common plane of the cage axis "0" and inner rotor axis "$0_2$" angularly shifts only very slightly throughout the full useful range of adjustment of the meter and whereby that common plane will remain substantially perpendicular to a plane extending through the primary axis "0" which bisects the diametrically opposed inlet and outlet ports 59, 60 of the meter. As a result, the individual rotor ports 55 will cooperate with the inlet and outlet ports 59, 60 to provide a highly efficient positive displacement meter throughout the full useful adjustment range of the meter.

A spacer 83 mounted within the inner rotor bore provides for axially positioning the inner rotor support bearing 81 generally centrally between the ends of the rotor. The axial ends of the inner rotor 74 are machined for low friction fluid sealing engagement with the inner radial face of the end flange 58 of the cage 35 and with an inner face of a sealing disc 39. The sealing disc 39 also engages the end face of the cage 35 to seal off that end of the generally annular cavity formed between the inner rotor 74 and the outer cage 35.

The inner rotor 74, which is preferably an aluminum extrusion, is formed with an annular arrangement of six equiangularly spaced partially cylindrical seats 84 for receiving axially extending vane support rod bearings 95 affixed to the inner end of each of six radially extending angularly spaced vanes 85 respectively. A radially outwardly extending vane clearance slot 86 is provided for each seat 84 to permit limited pivotal movement of each vane 85. A radially extending abutment 88 having an abutment surface 87 which extends generally radially outwardly from the axis of the cylindrical seat 84 is provided on the trailing side of each vane 85 for engagement with the vane to thereby limit the angular movement of the inner rotor 74 relative to the cage 35 in the direction of rotation of the rotor 74. One of the rotor abutments 88, or two of the rotor abutments 88 during each transition from one abutment to another, is in engagement with a vane 85 at all times to maintain the inner rotor 74 in appropriate angular orientation relative to the cage 35. The dynamics of the design are such that the inner rotor 74 tends to angularly lead the outer cage and so that, although the inner rotor 74 and outer cage 35 are not positively keyed to rotate together (in what would be a nonsymmetrical manner), the angular orientation of the inner rotor 74 and therefore the varying angular orientation of each vane 85 through a full revolution of the rotor assembly 5 is essentially the same for all six vanes. Accordingly, the variable displacement of the six variable displacement chambers are equal. The incremental volume displacement of the meter is therefore essentially constant for each predetermined angular interval of the rotor assembly 5.

Thus, each vane 85 is supported at its outer end between a pair of guide shoes 71 of the outer cage 35 and at its inner end by a cylindrical rod 95 mounted within a generally cylindrical seat of the inner rotor 74. The vanes 85, vane shoes 71 and support rods 95 have an axial dimension equal to the axial length of the rotor 74 and ring 57 to sealingly engage the end flange 58 and the sealing disc 39 and whereby there is minimal leakage between each variable displacement compartment 38 and the outer surrounding cavity within the housing 31. The parts are formed to close tolerances to minimize fluid leakage while permitting low friction movement of the vanes.

The end plate 39 which may for example be made of stainless steel is supported by a suitable bushing 94 rotatably mounted on the stub shaft 75. The bushing 94 and sealing plate 39 are axially shiftable together on the stub shaft 75 into axial engagement with the rotor 74, cage 35, vanes 85, etc., for closing that end of the variable displacement chambers 38 defined between each pair of angularly spaced vanes 85.

The outer housing cavity surrounding the rotor assembly 5 becomes filled with fluid due to some initial fluid leakage between the relatively moving parts and whereby the fluid pressure differential across any seal formed by two relatively moving parts will be relatively slight, thereby minimizing the fluid flow across each seal during meter operation. Also, the outer housing cavity will have essentially a constant volume during rotation of the rotor assembly 5 so that there is no external pumping action during meter operation which restrains rotor operation or which causes internal fluid flow between the external annular cavity surrounding the rotor assembly 5 and the internal variable displacement chambers 38.

The fluid pressure in the outer annular cavity will tend to remain at a constant pressure intermediate the inlet pressure (at the inlet port 59) and the outlet pressure (at the outlet port 60) and such that there will be a net inward fluid force on the end plate 39 urging the plate 39 into engagement with the outer ring 57, inner rotor 74, etc., (and thereby also urging the inner rotor 74, etc., into engagement with the cage support flange 58) and urging the entire rotor assembly 5 into engagement with the wear liner 64.

Figure 2:
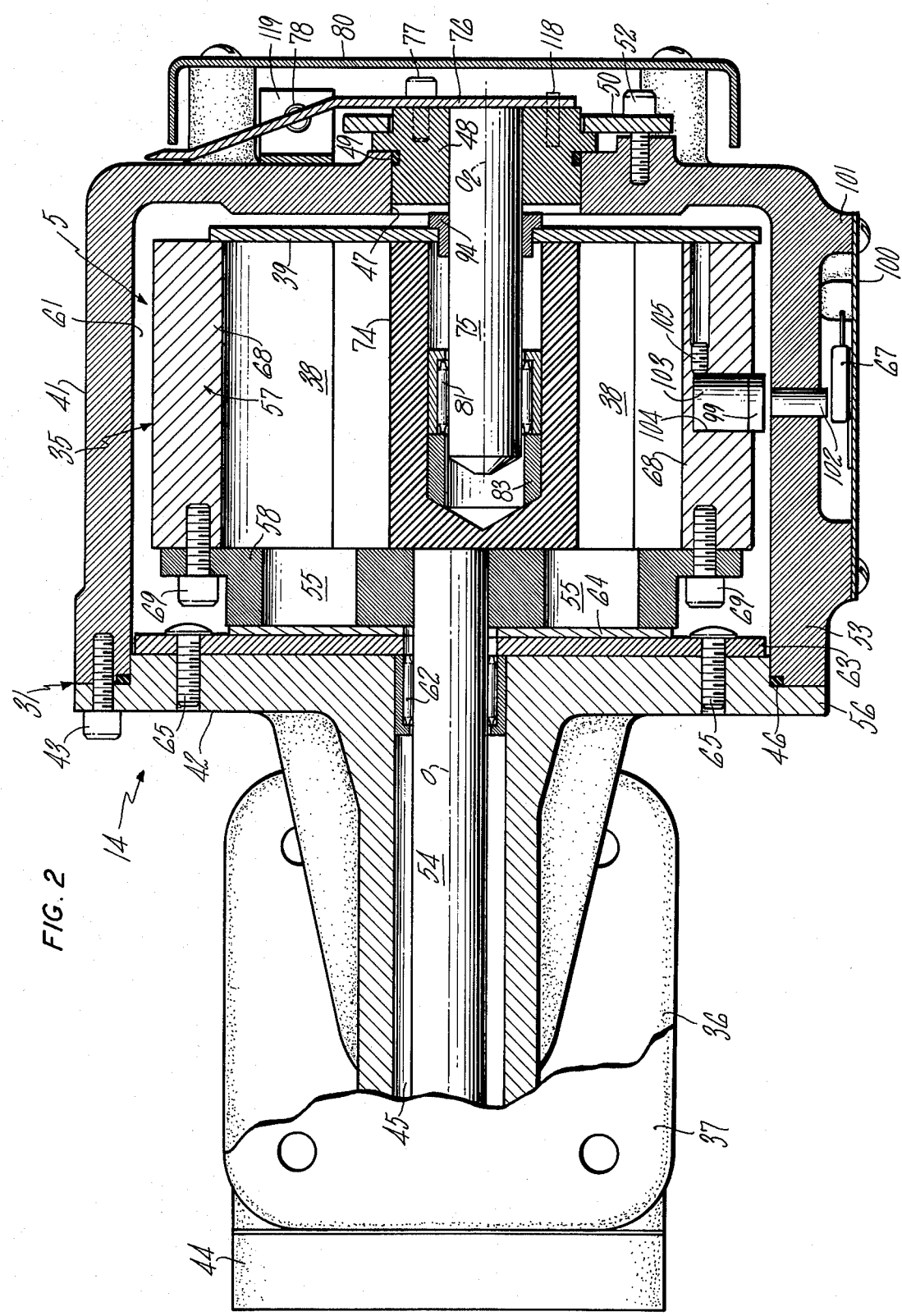
FIG. 2 is an enlarged longitudinal view, partly broken away and partly in section, of the fluid meter.

In order to control the bearing force on the wear liner 64 and the concomitant frictional resistance, the diaphragm 40 provides for axially urging the support shaft 54 via a ball thrust bearing 89 in the opposite axial direction, to the right as viewed in FIG. 2, to partially offset the fluid pressure generated axial force on the rotor assembly 5. A fluid passageway 93 between the fluid inlet passageway 32 and the chamber 91 provides for supplying fluid inlet pressure to the outer side of the diaphragm 40, and the fluid pressure on the inner side of the diaphragm 40 resulting from slight fluid leakage between the cage end flange 58 and wear liner 64 remains at a lower pressure (which is approximately midway between the inlet and outlet fluid pressures). Thus, the diaphragm force on the shaft 54 is a function of the fluid pressure differential between the inlet 32 and outlet 33 and provides for controlling the axial force on the wear liner 64 in accordance with the pressure differential across the meter and so that that force is not excessive.

In operation, the sliding-vane rotor assembly 5 is rotated, in the counterclockwise direction as viewed in FIG. 4, by gasoline entering the inlet 32 under pressure (established by the pump 11). As the meter rotates, each individual chamber 38 expands, due to the eccentricity of the inner rotor 74 relative to the outer cage 35, during the angular interval of approximately 180°, it is in communication with the inlet port 59. Similarly, each chamber 38 contracts to discharge fluid through the outlet port 60 as the chamber 38 rotates through an angular interval of approximately 180° it is in communication with the outlet port 60. The eccentricity of the inner rotor 74 relative to the cage 35 will establish the differential volume of each expansion chamber 38 during one revolution of the rotor and therefore the total volume of fuel metered for each revolution of the rotor assembly 5.

Referring to FIGS. 2 and 4, the meter 14 employs a volume output having two angularly spaced Hall effect probes or pickups 66, 67 that are mounted on a plate 100 fastened by suitable fasteners to bosses 101 on the cast housing part 41. The Hall pickups 66, 67 are positioned in operative radial alignment with a pair of soft iron ferromagnetic rods or plugs 102 mounted within radial bores in the housing 31.

Each Hall probe 66, 67 employs a suitable Hall effect sensor which, for example, forms a part of a solid state chip providing a magnetically operated solid state switch or digital threshold device (to which DC power is suitably supplied) that is operable to generate an electrical pulse or signal upon application of an appropriate flux field (having an intensity determined by the solid state switch) to the Hall sensor. For example, the ISS4 solid state probe made by Micro Switch Corporation and comprising a Hall sensor, a threshold trigger, and an amplifier and formed by a single integrated circuit may be used for this purpose. The ISS4 solid state probe, being unidirectional, requires that the magnetic field be in an appropriate direction to generate a pulse and "closes" to initiate a pulse or signal when the flux density applied to its Hall sensor reaches a first relatively high intensity threshold field and "opens" to terminate the pulse or signal when the flux density falls to a second relatively low intensity threshold field.

In the embodiment of the invention illustrated in FIGS. 2 and 4, twelve high strength, rare earth permanent magnets 99 are mounted on the ring 57 equiangularly spaced (i.e., 30° spaced) about the perimeter of the ring. Each magnet 99 is secured, as by bonding, to the outer end of a generally cylindrical plug 103 which is received in a radial bore 104 in the ring 57 and held therein by a set screw 105. Each magnet 99 has its poles at its opposite ends and is mounted so that its outer pole passes adjacent to but clear of the inner surface of the housing and ferromagnetic plugs 102.

The angularly spaced Hall probes 66, 67 and cooperating ferromagnetic plugs 102 are mounted so that each magnet 99 rotates through momentary alignment with each plug 102 as the rotor assembly 5 rotates. Each plug 102 forms a separate flux conductor for conducting the magnetic field of each magnet 99 through the nonmagnetic housing for operation of the respective Hall probe 66, 67 (in the direction and intensity required to generate an electrical signal or pulse) as the magnet 99 passes into alignment with the plug 102. Each magnet 99 has a magnetic strength sufficient to generate a signal with each Hall probe and so that the pulse generated by each magnet terminates before the following magnet is effective to generate a succeeding electrical signal or pulse.

Although a single Hall probe 66 is capable of providing a train of output pulses for metering the volume amount of fuel dispensed, the provision of a second Hall probe 67 is preferred as two such pickups may be useful (with appropriate circuitry incorporated in the electronic unit 16) for example for (a) more accurately measuring the angular displacement of the rotor assembly 5 and therefore the volume of fluid dispensed, (b) avoiding inadvertent stray pulse caused volume counts by requiring redundant pulses, one from each pickup, for the generation of a volume pulse, and (c) establishing two identical counting systems with the extra system being used as a backup system in case of failure of the other system.

Figure 6:
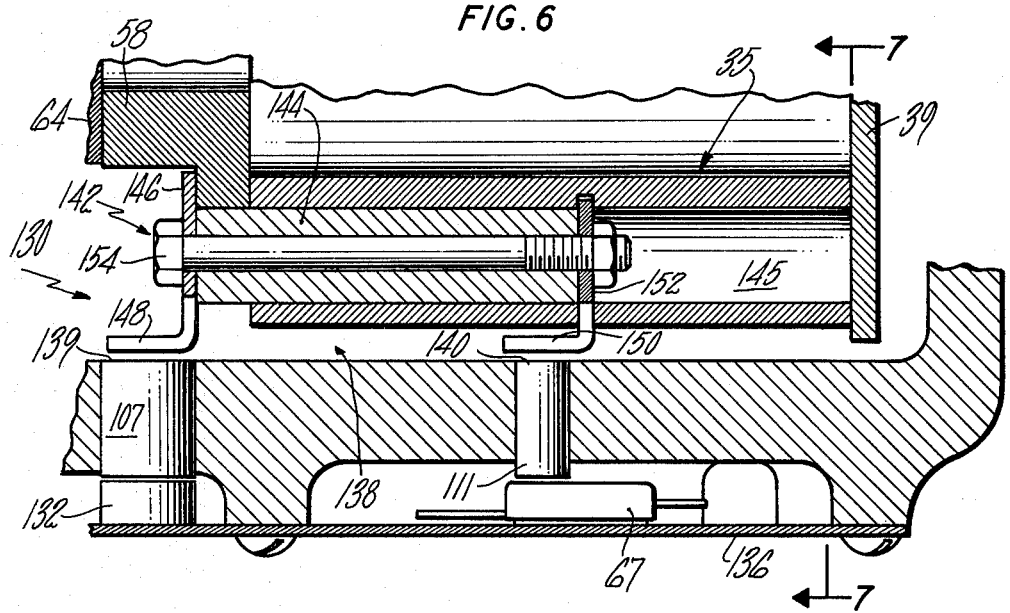
FIG. 6 is an enlarged partial longitudinal section view, partly broken away and partly in section, of a modified embodiment of a fluid meter of the present invention.
Figure 7:
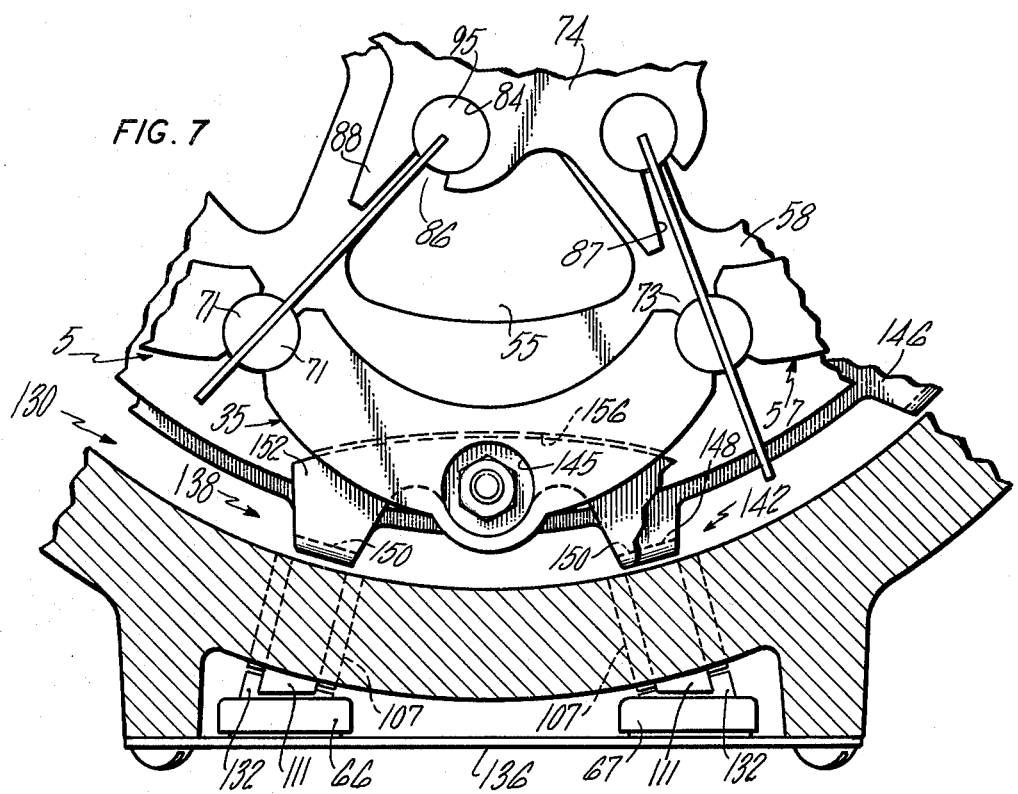
FIG. 7 is a partial transverse section view, partly broken away and partly in section, of the modified fluid meter taken substantially along line 7—7 of FIG. 6.

An alternate magnetic pulse generator 130, generally similar in operation to the pulse generator illustrated in FIGS. 2 and 4, is illustrated in FIGS. 6 and 7. In the pulse generator 130, a pair of angularly spaced magnets 132 are mounted externally of the meter housing generally in the transverse plane of the cage end flange 58 and in axially spaced angular alignment with the pair of angularly spaced Hall probes 66, 67. The magnets 132 and the Hall probes 66, 67 are mounted on a mounting plate 136 of a suitable low reluctance material which provides a magnetic flux conductor between the outer radial pole of each magnet 132 and the respective Hall probe 66, 67. A pair of flux conductor plugs 111 are mounted within suitable angularly spaced bores in the housing in operative radial alignment with the Hall probes 66, 67 respectively as in the embodiment of FIG. 2. Similarly, a pair of flux conductor plugs 107 are provided in suitable angularly spaced radial bores in the housing in alignment with the magnets 132 respectively.

A pair of axially extending and angularly spaced low reluctance generally U-shaped magnetic circuits 138 are thereby provided, each having opposite poles 139, 140 at the inner ends of the respective pair of axially spaced flux conductor plugs 107, 111. A rotatable flux conductor system 142 is mounted on the rotor cage 35 to alternatively complete and break a low reluctance magnetic circuit between the poles 139, 140 of each generally U-shaped magnetic circuit 138 and thereby operate each respective Hall pickup 66, 67 as the rotor assembly 5 rotates. The flux conductor system 142 comprises an annular arrangement of six equiangularly spaced axially extending flux conductors 144 received within axial bores 145 in the six ring segments of the cage 35. An end ring 146 mounted on the cage support flange 58 has twelve equiangularly spaced (i.e., 30° spaced) conductor shoes 148 which cooperate with the poles 139 at the inner ends of the angularly spaced conductor plugs 107. A similar ring of twelve equiangularly spaced conductor shoes 150, provided by six separate conductor segments 152, cooperate with the two angularly spaced flux conductor plugs 111. The six separate conductors 152 are mounted within radial slots 156 in the ring segments in engagement with the end face of the conductor rods 144, and the rotatable flux conductor rods 144, conductor ring 146, and conductor segments 152 are secured together and to the rotor cage 35 by suitable fasteners 154.

Each of the twelve axially spaced pairs of conductor shoes 148, 150 thereby provides a low reluctance flux path between each pair of poles 139, 140 when in alignment therewith to generate a volume pulse with the respective Hall probe 66, 67. A train of twelve equiangularly spaced pulses is thereby generated by each Hall pickup 66, 67 for each revolution of the rotor assembly 5. The electrical signals generated by the two Hall pickups 66, 67 can be used as in the manner of the dual signal generation provided by the volume output drive of FIGS. 2 and 4. In both embodiments, a volume signal or pulse is generated by each pickup 66, 67 for each predetermined incremental amount of fluid flowing through the meter 14. The incremental amount can be accurately established with the eccentricity adjustment mechanism described and whereby the meter 14 will accurately meter the volume of gasoline dispensed. The meter can be designed for example so that the adjustment mechanism can be set to establish an electrical pulse or signal, for example for each one hundredth of a gallon, liter or quart of gasoline dispensed. Also, if a larger number of pulses are desired for any predetermined incremental amount of fluid dispensed, additional Hall pulse generators could be provided at additional equiangularly spaced positions about the axis of the rotor assembly 5.

It can be seen that the volume output pulse trains are generated with a minimum torque requirement and whereby the meter can operate effectively with a very low pressure differential between its input and output. The low pressure differential in turn ensures greater meter accuracy by minimizing internal leakage between the expanding and contracting chambers 38 of the rotor assembly 5. In addition, the fuel or other fluid used may be used as a lubricant for all of the moving parts without diminishing the accuracy of the meter.

As will be apparent to persons skilled in the art, various modifications, adaptations and variations of the foregoing specific disclosure can be made without departing from the teachings of the present invention.

We claim:

1. A positive displacement rotary fluid meter comprising a housing, an enclosed rotor assembly rotatably mounted within the housing having an outer ring rotatably mounted about a first axis, an inner rotor rotatably mounted within the outer ring about an axis parallel and eccentric to the axis of the outer ring and with an annular chamber therebetween, a pair of axially spaced transverse end members for the annular chamber, and a plurality of generally radially extending and angularly spaced vanes connected to the outer ring and inner rotor and dividing the annular chamber into a plurality of separate positive displacement chambers which expand and contract during rotation of the rotor assembly, the housing having a transverse sidewall in flush engagement with one of the transverse end members of the rotor assembly and separate inlet and outlet passageways with respective generally diametrically opposed inlet and outlet ports in said one sidewall, said one transverse end member of the rotor assembly having a plurality of axial openings for the plurality of positive displacement chambers respectively, each in communication with the respective positive displacement chamber and in alternating communication with the inlet and outlet ports as the respective positive displacement chamber expands and contracts respectively during rotation of the rotor assembly, and magnetically operated pulse generator means comprising fixed magnetically responsive pickup means operative to generate an electrical pulse, and a plurality of pickup operating means mounted on the rotor assembly for operating the pickup means to generate an electrical pulse for each predetermined increment of rotation of the rotor assembly, the rotor assembly being axially shiftable to vary its axial force against said transverse housing sidewall and the housing having fluid therein externally of the enclosed rotor assembly and operative to bias the rotor assembly axially against said transverse housing sidewall.

2. A positive displacement rotary fluid meter comprising a housing, an enclosed rotor assembly rotatably mounted within the housing having an outer ring rotatably mounted about a first axis, an inner rotor rotatably mounted within the outer ring about an axis parallel and eccentric to the axis of the outer ring and with an annular chamber therebetween, a pair of axially spaced transverse end members for the annular chamber, and a plurality of generally radially extending and angularly spaced vanes connected to the outer ring and inner rotor and dividing the annular chamber into a plurality of separate positive displacement chambers which expand and contract during rotation of the rotor assembly, the housing having a transverse sidewall in flush engagement with one of the transverse end members of the rotor assembly and separate inlet and outlet passageways with respective generally diametrically opposed inlet and outlet ports in said one sidewall, said one transverse end member of the rotor assembly having a plurality of axial openings for the plurality of positive displacement chambers respectively, each in communication with the respective positive displacement chamber and in alternating communication with the inlet and outlet ports as the respective positive displacement chamber expands and contracts respectively during rotation of the rotor assembly, magnetically operated pulse generator means comprising fixed magnetically responsive pickup means operative to generate an electrical pulse, and a plurality of pickup operating means mounted on the rotor assembly for operating the pickup means to generate an electrical pulse for each predetermined increment of rotation of the rotor assembly, the rotor assembly being axially shiftable to vary its axial force against said transverse housing sidewall and differential fluid pressure means responsive to the differential fluid pressure between the meter inlet and outlet passageways to vary the axial force of the rotor assembly against said transverse housing sidewall.

3. A positive displacement rotary fluid meter according to claim 2 wherein the differential fluid pressure means comprises a fluid pressure chamber within the housing, an axially shiftable member separating the fluid pressure chamber into two separate chambers, means connecting one of said separate chambers to one of said passageways and the other separate chamber to have a fluid pressure different from the fluid pressure in said one passageway, the axially shiftable member being connected to the rotor assembly to bias the rotor assembly in one axial direction to vary its axial force against said transverse housing sidewall.

4. A positive displacement rotary fluid meter comprising a housing, an enclosed rotor assembly rotatably mounted within the housing having an outer ring rotatably mounted about a first axis, an inner rotor rotatably mounted within the outer ring about an axis parallel and eccentric to the axis of the outer ring and with an annular chamber therebetween, a pair of axially spaced transverse end members for the annular chamber, and a plurality of generally radially extending and angularly spaced vanes connected to the outer ring and inner rotor and dividing the annular chamber into a plurality of separate positive displacement chambers which expand and contract during rotation of the rotor assembly, the housing having a transverse sidewall in flush engagement with one of the transverse end members of the rotor assembly and separate inlet and outlet passageways with respective generally diametrically opposed inlet and outlet ports in said one sidewall, said one transverse end member of the rotor assembly having a plurality of axial openings for the plurality of positive displacement chambers respectively, each in communication with the respective positive displacement chamber and in alternating communication with the inlet and outlet ports as the respective positive displacement chamber expands and contracts respectively during rotation of the rotor assembly, magnetically operated pulse generator means comprising fixed magnetically responsive pickup means operative to generate an electrical pulse, and a plurality of pickup operating means mounted on the rotor assembly for operating the pickup means to generate an electrical pulse for each predetermined increment of rotation of the rotor assembly, mounting means for mounting the inner rotor about an axis parallel and eccentric to the axis of the outer ring and adjustable for varying the eccentricity of the inner rotor relative to the outer ring by angular adjustment of the inner rotor about a fixed adjustment axis parallel and eccentric to the axes of both the outer ring and inner rotor within an eccentricity adjustment range including an intermediate eccentricity where the common intersecting planes of the inner rotor axis and fixed adjustment axis is perpendicular to the common intersecting plane of the inner rotor axis and outer ring axis.

5. A positive displacement rotary fluid meter according to claim 4 wherein said intermediate eccentricity is approximately midway within the useful eccentricity adjustment range of the inner rotor.

6. A positive displacement rotary fluid meter comprising a housing, an enclosed rotor assembly rotatably mounted within the housing having an outer ring rotatably mounted about a first axis, an inner rotor rotatably mounted within the outer ring about an axis parallel and eccentric to the axis of the outer ring and with an annular chamber therebetween, a pair of axially spaced transverse end members for the annular chamber, and a plurality of generally radially extending and angularly spaced vanes connected to the outer ring and inner rotor and dividing the annular chamber into a plurality of separate positive displacement chambers which expand and contract during rotation of the rotor assembly, the housing having a transverse sidewall in flush engagement with one of the transverse end members of the rotor assembly and separate inlet and outlet passageways with respective generally diametrically opposed inlet and outlet ports in said one sidewall, said one transverse end member of the rotor assembly having a plurality of axial openings for the plurality of positive displacement chambers respectively, each in communication with the respective positive displacement chamber and in alternating communication with the inlet and outlet ports as the respective positive displacement chamber expands and contracts respectively during rotation of the rotor assembly, and magnetically operated pulse generator means comprising fixed magnetically responsive pickup means operative to generate an electrical pulse, and a plurality of pickup operating means mounted on the rotor assembly for operating the pickup means to generate an electrical pulse for each predetermined increment of rotation of the rotor assembly, the outer ring comprising an annular arrangement of a plurality of separate ring segments for the plurality of positive displacement chambers respectively providing axially extending generally cylindrical seats therebetween, and generally cylindrical vane support means in the generally cylindrical seats for connecting the vanes to the outer ring.

7. A positive displacement rotary fluid meter comprising a housing, an enclosed rotor assembly rotatably mounted within the housing having an outer ring rotatably mounted about a first axis, an inner rotor rotatably mounted within the outer ring about an axis parallel and eccentric to the axis of the outer ring and with an annular chamber therebetween, a pair of axially spaced transverse end members for the annular chamber, and a plurality of generally radially extending and angularly spaced vanes connected to the outer ring and inner rotor and dividing the annular chamber into a plurality of separate positive displacement chambers which expand and contract during rotation of the rotor assembly, the housing having a transverse sidewall in flush engagement with one of the transverse end members of the rotor assembly and separate inlet and outlet passageways with respective generally diametrically opposed inlet and outlet ports in said one sidewall, said one transverse end member of the rotor assembly having a plurality of axial openings for the plurality of positive displacement chambers respectively, each in communication with the respective positive displacement chamber and in alternating communication with the inlet and outlet ports as the respective positive displacement chamber expands and contracts respectively during rotation of the rotor assembly, and magnetically operated pulse generator means comprising fixed magnetically responsive pickup means operative to generate an electrical pulse, and a plurality of pickup operating means mounted on the rotor assembly for operating the pickup means to generate an electrical pulse for each predetermined increment of rotation of the rotor assembly, the outer ring and inner rotor comprising means for pivotally connecting each vane thereto for pivotal movement about axes parallel to the axes of the inner rotor and outer ring, and the rotor assembly comprising a plurality of abutment means for the plurality of vanes respectively, for limiting the pivotal movement of the respective vanes in one angular direction for thereby limiting the relative rotation of the outer ring and inner rotor in at least one angular direction.

8. A positive displacement rotary fluid meter according to claim 7 wherein the housing has a low friction liner forming said transverse sidewall in flush engagement with said one transverse end member of the rotor assembly.

9. A positive displacement rotary fluid meter comprising a housing with opposed sidewalls with an operating chamber therebetween and a housing extension extending axially from one of said sidewalls, a rotor assembly with a main support shaft rotatably mounted within the housing extension and extending into the operating chamber, an eccentric support shaft mounted on said other sidewall to extend axially into the operating chamber parallel and eccentric to the main support shaft, a first transverse end flange mounted on the main support shaft within the operating chamber in flush engagement with said one sidewall, an outer generally cylindrical ring mounted within the operating chamber on the first end flange generally coaxially with the main support shaft, an inner rotor eccentrically mounted on the eccentric support shaft within the outer ring with an annular chamber therebetween, a plurality of generally radially extending and generally equiangularly spaced vanes connected to the outer ring and inner rotor to divide the annular chamber therebetween into a plurality of separate positive displacement chambers having a displacement which expands and contracts during rotation of the rotor assembly, a second transverse end flange axially spaced from said first transverse end flange and enclosing the axial end of the annular chamber opposite said first end flange, the housing extension having separate inlet and outlet passageways with respective generally diametrically opposed inlet and outlet ports in said one housing sidewall, the first transverse end flange having a plurality of axial openings for the plurality of positive displacement chambers respectively, each in communication with the respective chamber and in alternating communication with the inlet and outlet ports in said one housing sidewall as the respective positive displacement chamber expands and contracts respectively during rotation of the rotor assembly.

10. In a fluid meter having a housing with a fluid inlet and outlet and a positive displacement fluid driven rotor assembly fully enclosed within the housing and in operative fluid connection with the fluid inlet and outlet to be rotated in direct proportion to the volume of fluid conducted through the fluid meter from the fluid inlet to the outlet, and pulse generating means for generating an electrical pulse for each predetermined increment of rotation of the rotor, the improvement wherein the pulse generating means comprises a fixed permanent magnet magnetic circuit portion with ferromagnetic plug means extending through the housing, magnetically responsive pickup means mounted externally of the housing and operative to generate an electrical pulse by momentarily establishing a predetermined magnetic level in the fixed magnetic circuit portion, and a rotary non-permanent magnet magnetic circuit portion with a plurality of equiangularly spaced flux conducting means mounted on the rotor assembly to cooperate with the ferromagnetic plug means for momentarily establishing said predetermined magnetic level in said fixed magnetic circuit portion with each pickup operating means during rotation of the rotor assembly to generate an electrical pulse with the pickup means.

11. A fluid meter according to claim 10 wherein the ferromagnetic plug means comprises at least one pair of axially spaced ferromagnetic plugs extending through the housing, wherein the magnetically responsive pickup means comprises a magnetically responsive pickup for each pair of axially spaced ferromagnetic plugs magnetically coupled therebetween and operative to generate an electrical pulse by momentarily establishing a predetermined magnetic level between the pair of plugs, and wherein each of the equiangularly spaced flux conducting means comprises a pair of axially spaced ferromagnetic means mounted on the rotor assembly to cooperate with each pair of ferromagnetic plugs for momentarily establishing said predetermined magnetic level therebetween during rotation of the rotor assembly to generate an electrical pulse with the respective pickup.

12. A fluid meter according to claim 11 wherein the ferromagnetic plug means comprises a plurality of angularly spaced pairs of said axially spaced ferromagnetic plugs.

13. In a fluid meter having a housing with a fluid inlet and outlet and a positive displacement fluid driven rotor assembly enclosed within the housing and in operative fluid connection with the fluid inlet and outlet to be rotated in direct proportion to the volume of fluid conducted through the fluid meter from the fluid inlet to the outlet, the rotor assembly comprising a rotatable outer ring member, an inner rotor member rotatably mounted within the outer ring member about an axis parallel and eccentric to the axis of the outer ring and with an annular chamber therebetween, and a plurality of generally radially extending and angularly spaced vanes connected to the outer ring and inner rotor members and dividing the annular chamber therebetween into a plurality of separate positive displacement chambers each having a displacement that expands and contracts during rotation of the rotor assembly, the housing inlet and outlet being in alternating communication with each positive displacement chamber as it expands and contracts respectively during rotation of the rotor assembly, the improvement wherein the meter comprises mounting means for mounting one of said rotatable members about an axis parallel and eccentric to the axis of the other member and adjustable for varying the eccentricity of said one rotatable member relative to said other rotatable member by angular adjustment of said one rotatable member about a fixed adjustment axis parallel and eccentric to the axes of both of said rotatable members within an eccentricity adjustment range including an intermediate eccentricity where the common intersecting plane of the axis of said one rotatable member and fixed adjustment axis is perpendicular to the common intersecting plane of the axes of both said rotatable members.

14. A fluid meter according to claim 13 wherein said one rotatable member is the inner rotor member.

15. In a fluid meter having a housing with a fluid inlet and outlet and a positive displacement fluid driven rotor assembly enclosed within the housing and in operative fluid connection with the fluid inlet and outlet to be rotated in direct proportion to the volume of fluid conducted through the fluid meter from the fluid inlet to the outlet, the rotor assembly comprising a rotatable outer ring, an inner rotor rotatably mounted within the outer ring about an axis parallel and eccentric to the axis of the outer ring and with an annular chamber therebetween, and a plurality of generally radially extending and angularly spaced vanes connected to the outer ring and inner rotor and dividing the annular chamber therebetween into a plurality of separate positive displacement chambers each having a displacement that expands and contracts during rotation of the rotor assembly, the housing inlet and outlet being in alternating communication with each positive displacement chamber as it expands and contracts respectively during rotation of the rotor assembly, the improvement wherein the outer ring comprises an annular arrangement of a plurality of separate ring segments for the plurality of positive displacement chambers respectively, providing axially extending generally cylindrical seats therebetween, and generally cylindrical vane support means in the generally cylindrical seats for pivotally connecting the vanes respectively to the outer ring.

* * * * *